Jan. 9, 1945.  G. R. CHITWOOD  2,367,004
GEAR CHECKING FIXTURE
Filed Feb. 23, 1944  2 Sheets-Sheet 1

Inventor
George R. Chitwood
By Blackmore, Spencer & Flint
Attorneys

Jan. 9, 1945.    G. R. CHITWOOD    2,367,004
GEAR CHECKING FIXTURE
Filed Feb. 23, 1944    2 Sheets-Sheet 2

Inventor
George R. Chitwood
By Blackmore, Spencer & Flint
Attorneys

Patented Jan. 9, 1945

2,367,004

UNITED STATES PATENT OFFICE 2,367,004

GEAR CHECKING FIXTURE

George R. Chitwood, Indianapolis, Ind., assignor to General Motors Corporation, Detroit, Mich., a corporation of Delaware Application February 28, 1944, Serial No. 524,203

6 Claims. (Cl. 33—179.5)

This invention relates to a gage or fixture for checking gears, particularly to check the pitch diameter, the concentricity and parallelism with the bore, and any lead or helix of the gear teeth.

In modern practice where gears of any type are used on aircraft engines, or in other relations where extreme accuracy is necessary, it is desirable to check each gear to determine that the teeth thereof are properly shaped and that the gear is accurate and precise in all respects. This cannot be done visually, and where small inaccuracies are present and are difficult to discover by any ordinary means, it is desirable to have some kind of a device or means whereby small inaccuracies can be determined so that the gear may be corrected to bring it to the necessary degree of accuracy. The fixture or device of the present invention was designed to check a gear and determine the three most likely sources of error, that is, (1) to check the pitch diameter; (2) to check the concentricity of the teeth and their parallelism with the bore of the gear; and (3) to check the lead or helix of the gear teeth.

The fixture of the invention is provided with three gages or indicators, one for each of the three mentioned sources of inaccuracy to be checked. Two of these gages are mounted on a housing or block in which there is slidably mounted a shaft having a head thereon and the third indicator is mounted on the head. The head has pivoted thereto an anvil and a movement of this anvil is communicated to the indicator mounted on the head. The other two indicators have their probes in contact with the head, one being in contact with the upper surface to have communicated to the probe the rotary motion of the head, and the other indicator has its probe contacting with the front face of the head to receive any amount of axial movement of the head and shaft. The gear to be tested is mounted on a post at the front of the fixture, and by having the indicators previously set to zero by the use of a master gage, the exact amount or degree of error in a gear can be read directly from the gages for any gear applied to the post. The reading on the dial of the gages which departs either way from zero will be the amount of error in the gear.

Figures 1, 2, 3, 4:
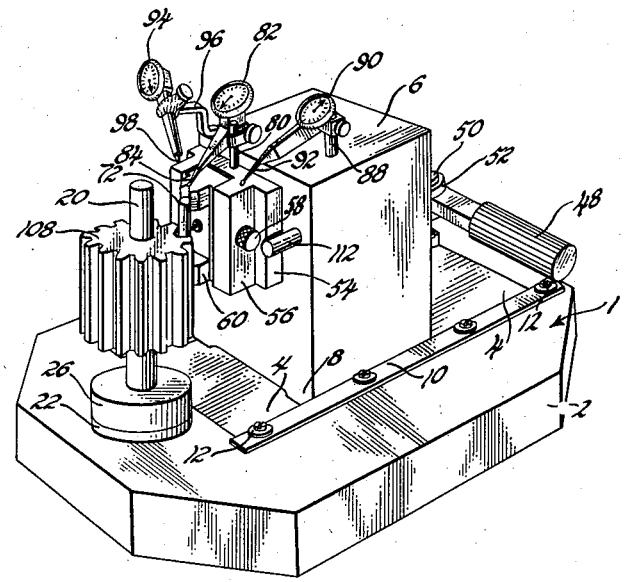
Figure 1 is a perspective view of the fixture, showing a gear to be checked in position on the post.
Figure 2 is an enlarged sectional view through the center of the fixture with the indicators removed and no gear on the post.
Figure 3 is a perspective view of the master gear.
Figure 4 is a perspective view of the anvil which is pivoted in the head.

Referring to the drawings, the fixture as a whole is indicated at 1. The fixture comprises the base 2 having a depressed part 4 in which there is mounted a block or housing 6 having the lower lateral flanges 8. Metal strips 10 at each side of the housing are secured to the base 2 and overlap the flanges 8 and rigidly hold the housing 6 in position. If it is desired to adjust the housing, the screws 12 which hold the strips 10 on the base 2 can be loosened and the housing 6 slid forward or backward as the case may be. The screws 12 can then be retightened.

The base 2 is provided with an opening 14 at its end, and in this opening a bushing 16 is received. In the bushing there is received the lower enlarged end 18 of a post 20 which projects upwardly in front of the housing. The post 20 preferably has the enlarged flange 22 which rests on top of the base 2. If desired or necessary, a filler block 26 may be used and applied over the post 20.

The housing 6 is provided with an opening 28 therein, and in this opening there is secured the bearing 30. In the bearing 30 there is slidably mounted the shaft 32 one end of which is reduced as at 34 and a coil spring 36 fits around the reduced part 34. A plate 38 is secured to the rear of the housing 6 by means of the screws 40 and through an opening 41 in the plate the rear threaded end 42 of the shaft projects. The spring 36 abuts against the plate 41. A nut 44 is threaded on the end of the shaft, and between the nut 44 and the plate 38 there is positioned a fork 46 having a handle 48 pivoted by the pin 50 in the ears 52 secured to the plate 38.

Figure 5:
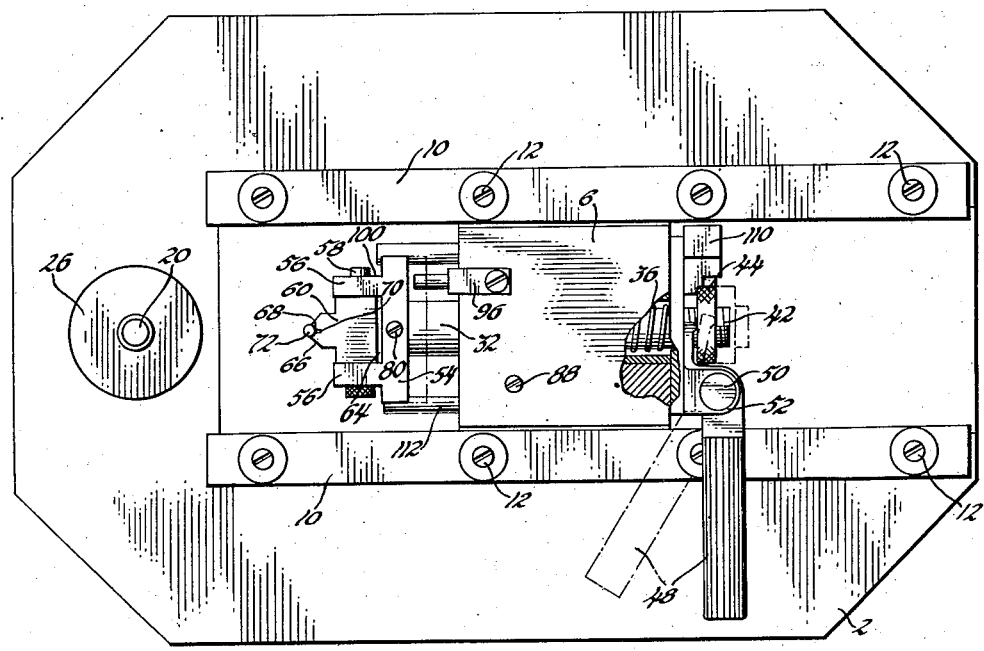
Figure 5 is a top plan view of the fixture with parts broken away and shown in section better to illustrate the construction, and with the indicators removed.
Figure 6:
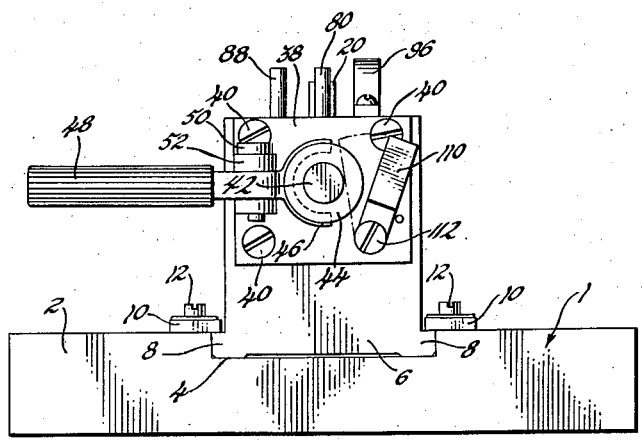
Figure 6 is an end view of the fixture with the indicators removed.

The opposite end of the shaft 32 is formed into a head 54. The head has the forwardly extending ribs 56 each of which is provided with a central opening for the purpose of receiving a pin 58. Between the ribs 56 there is mounted the anvil 60 which is provided with an opening 62 to receive the pin 58. The rear part of the anvil is spaced from the base of the head 54 as is indicated by the space at 64 and the front end parts of the anvil have projecting tapered parts 66 as is best shown in Figures 4 and 5. The tapered parts have the tip cut out to V formation as shown at 68, and there is also a deepening cut 70 positioned at the bottom of the V-shaped formation 68. The sides of the V 68 form an angle of 90°. Between the end parts 66 and positioned in the the V-shaped formations, there is a pin 72 which has a central groove 74 around which there is wound one end of a wire 76, the other end of which is bent and is fastened by means of a screw 78 to the anvil 60. The wire 76 holds the pin 72 in the V formation 68.

The head 54 is provided with a post 80 on which there is mounted an indicator or gage 82 having a movable probe or finger 84 which contacts with the anvil 60 at the end of the cut 70 of the V-shaped groove 68.

The housing 6 has a post 88 on which there is mounted a second indicator 90, the probe or finger 92 of which rests on top of the head 54 as is best shown in Figure 1.

The housing 6 has a third indicator 94 mounted on a bracket 96 secured to the housing 6. The probe 98 of the indicator 94 rests on the front face of the housing at the surface indicated at 100 in Figure 5.

These indicators or gages 82, 90 and 94 may be of any suitable type and are provided with a dial and pointer and a suitable meter mechanism. The gages or indicators and their probes are conventionally indicated, and per se form no part of the invention.

The initial operation for the machine is to take a master gage 102 as shown in Figure 3 and place it on the post 20 with the groove 104 facing the head 54 and pin 72. The groove 104 in the master gage 102 is an exact reproduction of the correct space between two adjacent teeth of the gear to be gaged. This groove 104 is also in exact parallelism with the centerline of the bore 106 of the master gear 102. To put the master gear 102 in position on the post 20, the operator will pull forward on the handle 48 to withdraw the head 54 and shaft 32 rearwardly and compress the spring 36. The master gear 102 is now placed on the post 20 and the operator then gradually releases the handle 48 to cause the pin 72 to fit in the groove 104. The pitch circle of the gear will intersect the axis of the pin 72. The gages 82, 90 and 94 are now all adjusted so that their pointers read zero for the reason that this is the reading desired for an accurate gear. The handle 48 is then again operated to enable the operator to remove the gage 102, and a gear to be checked 108 is then placed on the post 20. The handle is again gradually released so that the pin 72 fits in the space between adjacent teeth on the gear.

1. Should there be any lack of parallelism between the teeth and the bore of the gear, i. e., if the groove be deeper at one end, this will be shown by a slight tilting of the anvil 60 through its pin 58. The pin 72, of course, will communicate this out-of-parallelism to the anvil and the movement of the anvil will be transmitted to the probe 84 of the gage 82 so that the movement of the anvil will be registered on the gage 82.

2. If the gear being checked is a spur gear, then the gage or indicator 90 should register zero because there is no lead to the gear. If the gear is other than a spur gear, the pin 72 as it fits in the groove between adjacent teeth will cause the head 54 to rotate through an angle in accordance with the inclination of the teeth or in accordance with the lead and this turning of the head will move the probe 92 to cause the dial and pointer of the indicator 90 to register the lead angle. By a suitable graduation of the dial the lead angle can be read directly or the amount of error determined.

3. The indicator 94 will indicate the amount of error in the pitch diameter. If this diameter be inaccurate, the pin will be positioned more or less deep in the groove and this change in depth over the normal position will cause the head 54 to advance to or recede from the gear and this axial movement of the head will be communicated to the indicator 94 by its probe 98 and the reading on the dial will indicate the error in the pitch diameter. The indicator 94 also checks the runout of the gear, i. e., the concentricity of the gear teeth pitch circle with the bore of the gear.

Any one of the above errors may affect more than one indicator, but the operator, with a little experience, can determine the amount of any error in a gear by interpreting the various indicator readings.

A latch 110 is pivoted at 112 to the plate 38. The purpose of this latch is to lock the head 54—through the intermediary of the shaft 32 and the nut 44—and prevent the spring 36 from forcing the head toward the mounting post 20 when the handle 48 is released. The latch 110 is hand operated.

A pin 112 is secured in the block 6 and limits the angular or rotary movement of the head 54.

I claim:

1. In a gear checking fixture, a base, a housing and a post supported on the base, said post adapted to receive the gear to be checked, a shaft turnably supported in the housing, a head on the end of said shaft, means constantly urging the shaft out of the housing and the head away from the housing and toward the post, an anvil pivoted to the head, a pin mounted on the anvil and projecting away therefrom, said pin being adapted to be engaged in the space between adjacent teeth of the gear on the post, a plurality of indicators mounted on the housing and having operative contact with the head and being operated from the head by the movement thereof, said indicators indicating the lead of the gear and the amount of the runout thereof, an indicator mounted on the head and having operative contact with the anvil and being operated from the anvil by the movement thereof, said indicator indicating the misalignment of the gear teeth with reference to the axis of the gear, the movement of the anvil and the head caused by any error in the gear being registered on the indicators.

2. The invention of claim 1, said indicator measuring the lead of the gear being in operative contact with the top face of the head to communicate to the indicator the rotary motion of the head caused by an error in the gear.

3. The invention of claim 1, said indicator measuring the runout of the gear being in operative contact with the front face of the head to communicate to the indicator the axial movement of the head caused by an error in the gear.

4. In a gear checking fixture, a base, a housing and a post supported on the base, said post adapted to receive the gear to be checked, a shaft turnably supported in the housing, a head on the end of said shaft, means constantly urging the shaft out of the housing and the head away from the housing and toward the post, means on the head and projecting away therefrom and being adapted to be engaged in the space between adjacent teeth of the gear on the post, an indicator mounted on the housing and being operated from the head by the rotary movement thereof, the movement of said head caused by an error in the gear being registered on the indicator, said indicator indicating the lead of the gear.

5. In a gear checking fixture, a base, a housing and a post supported on the base, said post adapted to receive the gear to be checked, a shaft turnably supported in the housing, a head on the end of said shaft, means constantly urging the shaft out of the housing and the head away from the housing and toward the post, means on the head and projecting away therefrom and being adapted to be engaged in the space between adjacent teeth of the gear on the post, an indicator mounted on the head and being operated from said means by the movement thereof, the movement of said head caused by an error in the gear being registered on the indicator, said indicator indicating the misalignment of the gear teeth with reference to the axis of the gear.

6. In a gear checking fixture, a base, a housing and a post supported on the base, said post adapted to receive the gear to be checked, a shaft supported in the housing, a head on the end of said shaft, means constantly urging the shaft out of the housing and the head away from the housing, means mounted on the head and adapted to be engaged in the space between adjacent teeth of the gear on the post, an indicator mounted on the housing and being operated from the front face of the head by the axial movement thereof, the movement of the head caused by an error in the gear being registered on the indicator, said indicator indicating the amount of the run-out of the gear.

GEORGE R. CHITWOOD.